H. C. BOWERS.
CIRCULATING STEAM GENERATOR.
No. 188,575. Patented March 20, 1877.
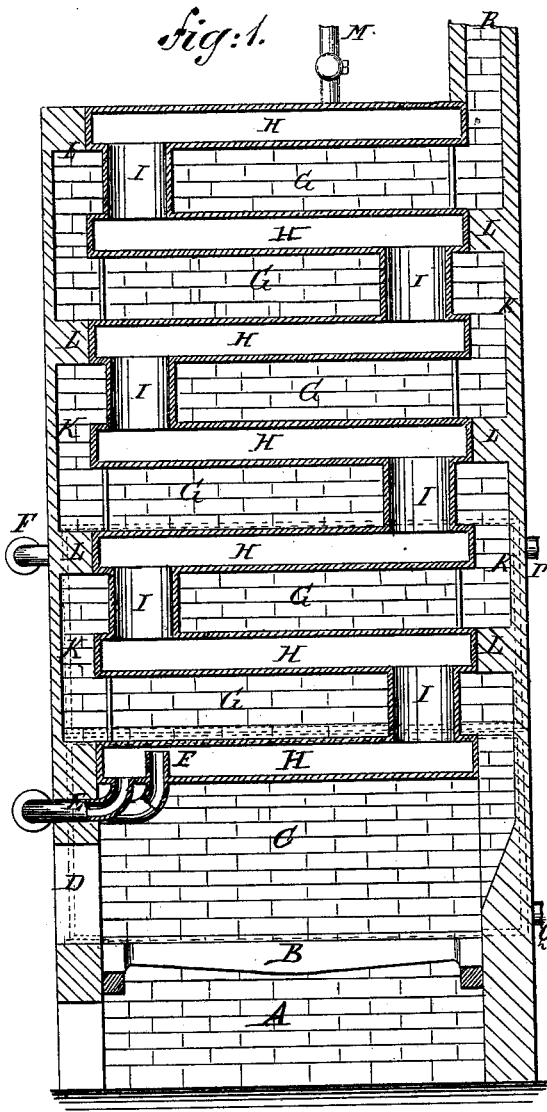
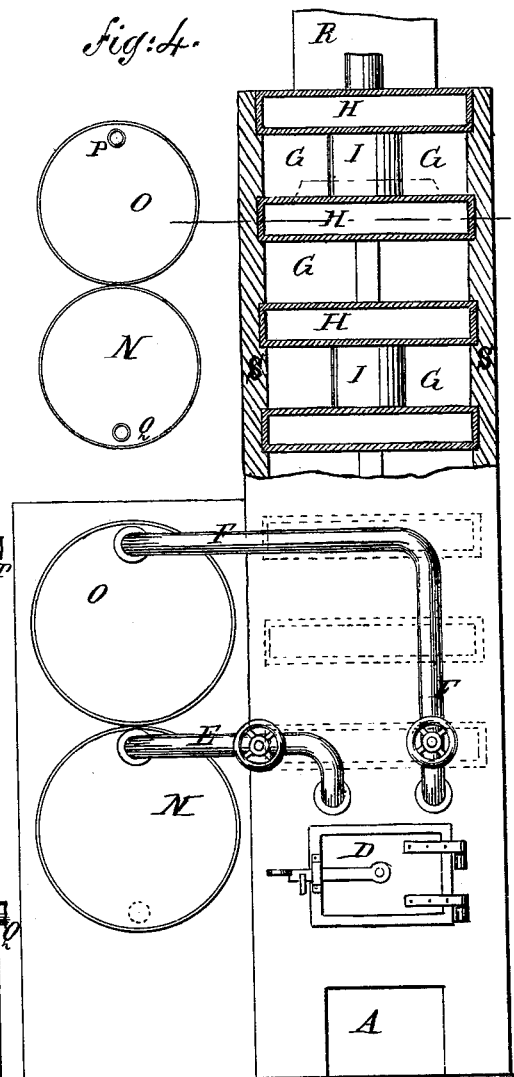
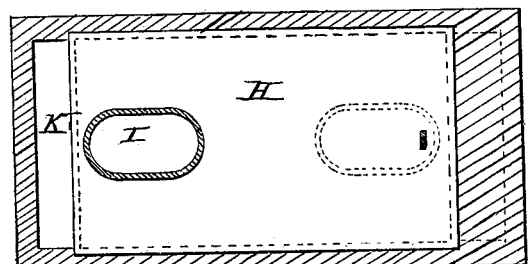
Witnesses:
Frank Fuller
John Donohue
Inventor:
Henry C. Bowers

UNITED STATES PATENT OFFICE.

HENRY C. BOWERS, OF NEW YORK, N. Y.

IMPROVEMENT IN CIRCULATING STEAM-GENERATORS.

Specification forming part of Letters Patent No. 188,575, dated March 20, 1877; application filed September 19, 1876.

*To all whom it may concern:*

Be it known that I, HENRY C. BOWERS, of the city, county, and State of New York, have invented a new and useful Improvement in Steam-Generators; and I declare the following to be a full, clear, and exact description thereof, reference being had to the drawing accompanying this specification, and making a part thereof.

The object of my invention is to provide a means for generating steam to be used as power, or for other purposes, more cheaply, and with greater safety at a high pressure than is possible by the employment of any boiler or generator of which I have any knowledge, while at the same time I secure great compactness in form, and am able to maintain the steam-generating process with a much smaller bulk and weight of water than is usually employed.

Figure 1 is a transverse vertical section of my steam-generator. Fig. 2 is an end view of the generator, reservoir, and steam-drum, together with the connecting-pipes. Fig. 3 is a top view of a chamber of the generator. Fig. 4 is the reverse end of the reservoir and steam-drum.

A is the ash-pit. B is the grate. C is the fire-pot. D is furnace-door. E is the overflow-pipe leading to reservoir. F is the steam-pipe leading to steam-drum. G G G G G G G are horizontal sections of the flue under and between the separate chambers of the steam and water way. H H H H H H are the horizontal chambers of the steam and water way. I I I I I I are the perpendicular oblong pipes connecting the chambers. K K K K K K are the ends of the flue-sections. L L L L L L are the walls abutting against the ends of the chambers opposite the ends of the flue-sections. M is the feed-pipe. N is the overflow-reservoir. O is the steam-storage drum. P is the exit-pipe or steam-supply pipe leading from the steam-drum. Q is the discharge-pipe of the reservoir N. R is the chimney-flue. S S are the longitudinal sides of the flue-sections.

The operation of my invention is as follows: A connection being formed at M with the water-supply, and a fire being kindled upon the grate B, a little water is allowed to run down the chambers. Steam is quickly formed, as only a thin film of water is to be vaporized. As soon as steam is emitted through the pipe F, which fact is determined by examination, the supply of water through feed-pipe M is made continuous, being regulated by the rapidity with which it is converted into steam, the latter depending upon the amount of heat generated in the fire-box C. The steam, as generated, is conducted through pipe F into the drum O, where it is stored for use, and from which it is conducted to the engine or employed for any appropriate purpose. With the continuous and properly-regulated flow of water from above, and the continuous application of heat below, the discharge of steam through the pipe F is continuous and rapid. The overflow-pipe E serves to discharge any unconverted water from the lower chamber into reservoir N.

In practice it is found that little water fails to be converted into steam after the continuous operation of the appliance is fully established, while, as the heat lessens, a larger proportion remains unconverted and escapes into the reservoir. The generation of steam is materially facilitated by supplying the feed-pipe M with water the temperature of which has been raised to the boiling-point. The waste hot water from the reservoir N may be appropriately utilized for this purpose.

The chambers H and pipes I may be made of cast or wrought iron, or other suitable material, and must be steam-tight through the entire course from the point of entrance of the feed-pipe M to the exit-pipes at the lowest chamber.

The form of the pipes I may be varied, or their number multiplied, provided the object sought—that of securing a continuous and diffused flow of water from upper to lower and from colder to hotter points—is secured.

The heads K of the flue-sections are preferably of boiler-iron. The longitudinal sides of the flue-sections may be of brick or iron, or other suitable material, and the entire walls of the heat-flue, extending from the fire-pot C to the chimney-flue R, of whatever materials constructed, should have tight joints, so that the heated gases of combustion may not escape and be wasted. The entire exterior may be further protected by a covering of felt or other imperfect conductor of heat. The steam-drum O and overflow-reservoir N are simple tight cylinders, and may be made of boiler-iron or other suitable material.

The essential features of my invention, and those to which I attach chief value, are the method of distribution, in a steam-generator of the described construction, of a continuous supply of water passing downward in thin layers over the extended inner surfaces of the lower plate of the chambers, and, therefore, from a colder to a hotter region, while, at the same time, the heat-currents are continually passing upward and impinging upon both sides of said chambers from a hotter to a colder surface. So far as I am aware, this method of construction is new.

It is proper to say that of its utility I have had many practical evidences. I find, first, that the plan of feeding the water to be converted at the top of the generator seems to perfectly utilize the heat, because, as the top is the coldest part, any heat not taken up here must pass out at the chimney-flue; second, that the continuous supply gravitating downward, whether such supply is intermittent—as from a feed-pump—or under steady pressure, its natural downward determination is found to be the cheapest means of distributing the water over the evaporating surfaces for conversion into steam; third, that the distribution in thin layers over extended surfaces within an inclosed water-way, of the water to be vaporized, such extended surfaces presenting their reverse sides to the heat-currents, involves at once an economy of fuel and of water, since, under such conditions, the conversion into steam of a given quantity of water is far more rapid than under any other conditions which I can conceive of; fourth, that the arrangement of chambers and flues herein set forth, by which the descending water and steam are continually taking up, and never giving off, heat from the commencement of the heating process until the exit of the steam, is valuable, since the flues of ordinary steam-boilers are found to give off heat which passes as waste up the chimney whenever, under high pressure, the fire is allowed to slacken, while in my generator no such waste can occur.

The continual upward passage of the heat in contact with the extended surfaces of the steam and water way, and from a hotter to a colder region, is important, because, if the surfaces which the products of combustion come in contact with are as hot as such products of combustion, no heat can possibly be given off by such products or taken up by such surfaces.

It is important that the surfaces should be extended, in order that the water to be vaporized may possess little depth, and that they should be situated above the products of combustion, in order that the natural tendency of heated currents to rise may be taken advantage of by providing surfaces of lowering temperature for the absorption of the ascending heat.

I find that the arrangement by which I withdraw the steam from the bottom, and in close proximity to the fire, is of importance, because at this point, which is the hottest part of the boiler, superheated steam can be drawn off without an intermediate device for the purpose. The exit of steam at this point serves to preserve the lower chamber from melting, by allowing steam of a lower temperature to take the place, at all times, of the more highly heated product.

I find it important to connect the steam-reservoir with my steam-generator, because by the storage of steam in the reservoir all violent fluctuations of pressure are avoided, and a steady and unintermittent supply is secured.

I deem the employment of the described water-reservor essential, because until the generator is fairly at work, and before the flow of water is regulated to the capacity of the fire, a larger quantity of water is liable to flow in than is converted into steam. This hot water would be wasted if some provision were not made for storing it.

By the use of a reservoir of suitable dimensions the water may be stored and pumped back through the feed-pipe for the utilization of whatever heat it may contain. Another great advantage of this reservoir is that in the event of the necessity for a temporary suspension of the working off or use of steam the steam-storage drum may be locked upon its contained steam, and the water may be allowed to flow through the generator and pass as hot water into the overflow-reservoir, thereby preserving the generator from injury by heat, and obviating the necessity of blowing off steam. I deem it important to add that an explosion in this boiler or generator is entirely impossible. By my arrangement no large body of water is ever precipitated into the generator, nor is water ever brought in sudden contact with cold surfaces.

The dimensions of the several parts of my generator may be varied according to the amount of steam desired. I have constructed one having twenty-two chambers, each chamber being six feet long by five feet wide, and corresponding in size to the grate-surface, the depth of said chambers being three inches, and the flue-spaces between the chambers being four inches. This has operated economically and successfully with anthracite coal as fuel. I have also tested successfully a generator on this plan, provided with eleven chambers, each chamber being two feet long by six inches wide and two and a half inches deep, the flue spaces between the chambers being three inches deep, and the grate area covering two superficial feet. I do not, therefore, limit the number or the size of the chambers; nor do I confine them to the precise size of the grate-surface. It is probably true that the greater the number of the chambers, within reasonable limits, the more completely will fuel be economized.

What I claim as new, and desire to secure by Letters Patent, is—

1. The arrangement of the several parts, consisting of the chambers H, connecting-pipes or tubes I, alternating at each end of said chambers, whereby water is continuously supplied to the top of the described steam-generator, and distributes itself downward in thin layers over the extended inner surface of the lower plate of said chambers, from a colder to a hotter region, together with the described arrangement of the flues, by which the heat-currents are conducted from side to side, as shown, and made to impinge upon both sides of said chambers from a hotter to a colder region.

2. In a steam-generator, substantially as described, the arrangement of the feed-pipe M, provided with check-valve, &c., the chambers H, connecting-pipe I, exit-steam pipe F, and waste-water pipe E, arranged with relation to the reservoirs N and O, in the manner and for the purposes set forth.

3. The combination, with the chambers H and pipe I, of the alternate stops, passages K, flues G, and combustion-chamber C, constructed and arranged to operate substantially as described.

HENRY C. BOWERS.

Witnesses:
ANNIE W. FULLER,
FRANK FULLER.